United States Patent
Samadi et al.

(10) Patent No.: US 7,336,607 B2
(45) Date of Patent: Feb. 26, 2008

(54) METHODS AND APPARATUS FOR FLOW CONTROL BASED PACKET AGGREGATION IN A COMMUNICATION NETWORK

(75) Inventors: Behrokh Samadi, Saratoga, CA (US); Qinqing Zhang, Morganville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1035 days.

(21) Appl. No.: 10/330,791

(22) Filed: Dec. 27, 2002

(65) Prior Publication Data

US 2004/0125747 A1 Jul. 1, 2004

(51) Int. Cl.
| | |
|---|---|
| H04J 1/16 | (2006.01) |
| H04J 3/24 | (2006.01) |
| H04J 3/18 | (2006.01) |
| H04Q 7/00 | (2006.01) |
| H04L 12/66 | (2006.01) |
| H04L 12/56 | (2006.01) |
| H04L 12/28 | (2006.01) |
| H04B 7/216 | (2006.01) |

(52) U.S. Cl. .................. 370/230.1; 370/231; 370/232; 370/235; 370/238; 370/248; 370/253; 370/328; 370/356; 370/394; 370/400; 370/473; 370/474; 370/477

(58) Field of Classification Search ..................... None
See application file for complete search history.

(56) References Cited

U.S. PATENT DOCUMENTS

| | | | | |
|---|---|---|---|---|
| 6,105,064 A | * | 8/2000 | Davis et al. ................. | 709/224 |
| 6,415,410 B1 | * | 7/2002 | Kanerva et al. ............ | 714/749 |
| 6,564,267 B1 | * | 5/2003 | Lindsay ...................... | 709/250 |
| 6,754,228 B1 | * | 6/2004 | Ludwig ....................... | 370/468 |
| 6,990,070 B1 | * | 1/2006 | Aweya et al. ............... | 370/230 |
| 7,089,320 B1 | * | 8/2006 | Biederman et al. ......... | 709/234 |
| 2005/0022089 A1 | * | 1/2005 | Le et al. ..................... | 714/749 |

* cited by examiner

*Primary Examiner*—Melanie Jagannathan
(74) *Attorney, Agent, or Firm*—M. J. Hodulik

(57) ABSTRACT

The present invention is a methodology for providing packet aggregation based on transmission window size to achieve improved transport efficiency. One embodiment of the invention includes the steps of receiving an indication of a transmission window size for packets to be transmitted from a first location to a second location where the transmission window size provided by a flow control message. The transmission window size is utilized to determine a bundling factor for transmission of packets from said first location to said second location, the bundling factor being a lesser of a maximum bundling factor and the transmission window size. A transmission window size threshold represents a boundary for a size of a transmission window when transmission of existing frames may be delayed. The frames are bundled according to the bundling factor if the transmission window size is greater than the transmission window size threshold.

18 Claims, 3 Drawing Sheets

PROTOCOL STACK IN THE REFERENCE RADIO ACCESS NETWORK

RADIO ACCESS NETWORK REFERENCE ARCHITECTURE

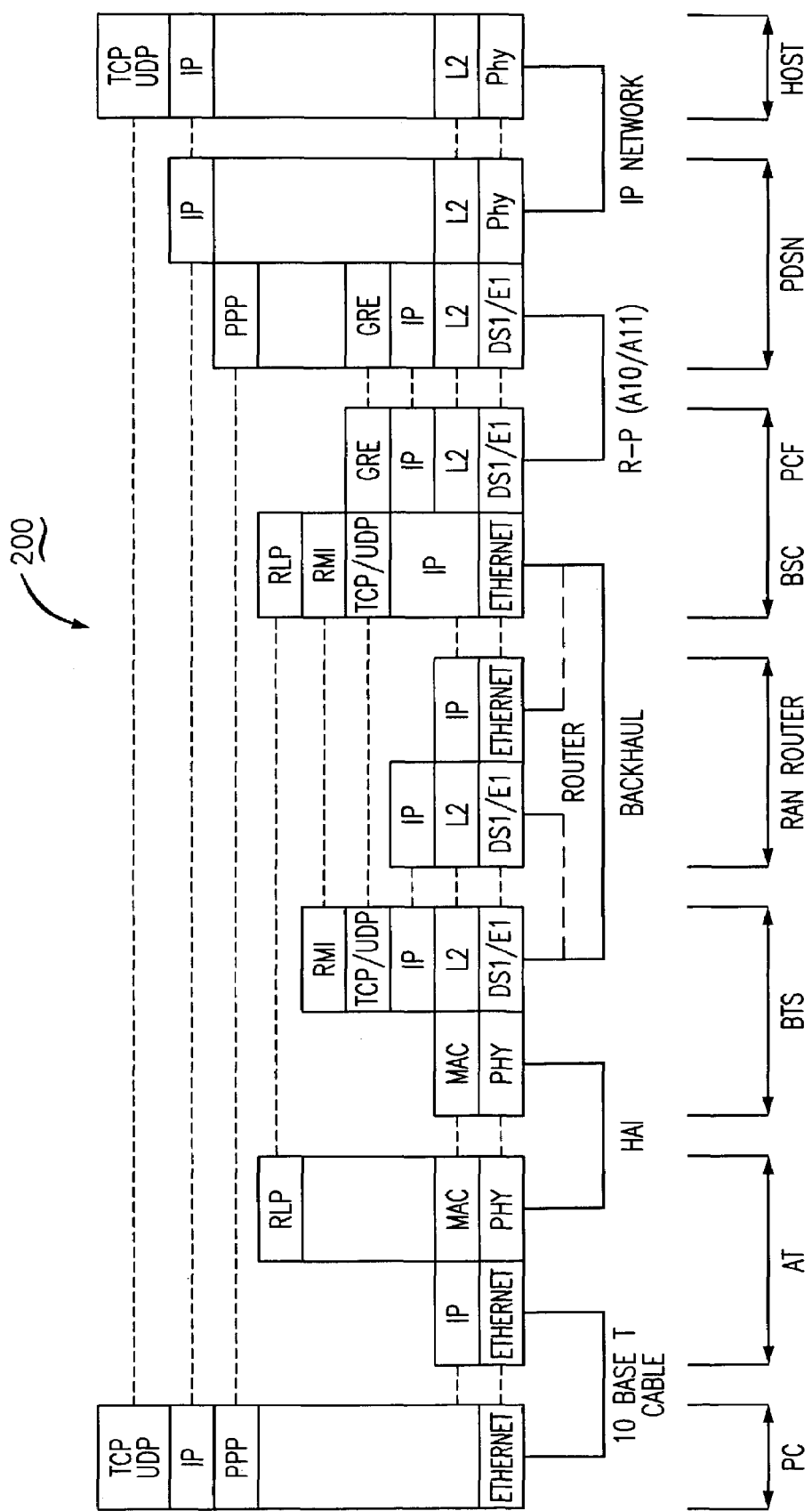
FIG. 2  PROTOCOL STACK IN THE REFERENCE RADIO ACCESS NETWORK

FLOW CONTROL BASED PACKET AGGREGATION ALGORITHM.

METHODS AND APPARATUS FOR FLOW CONTROL BASED PACKET AGGREGATION IN A COMMUNICATION NETWORK

FIELD OF THE INVENTION

The present invention relates generally to packet communications networks and more particularly to packet aggregation and/or multiplexing techniques within such networks.

BACKGROUND OF THE INVENTION

Referring to FIG. 1, an exemplary network 100 including multiple nodes is shown. The exemplary network 100 may be, for example, a radio access network for high speed wireless data applications. Typical radio access networks, like that shown in FIG. 1 include one or more Access Terminals 102 (AT), Base Stations 104 (BTS), and Base Station Controllers 106 (BSC). A PDSN 108 interfaces between the IP network and the radio access network. The BSC 106 receives data from the core network 110 and passes the data to the BTS 104 so that the BTS can transmit the data to the AT 102 over the wireless link 120. Data is communicated through the reverse direction as well and passed from AT 102 to the core network 110. In general, each node consists of multiple functional components or units, where for example, each component is responsible for providing different functions or services. For example, at a Base Station, there may be a cell radio control unit, modem card unit and radio/amplifier unit to fulfill the overall function of a base station.

To further describe the information transmission between BSC and BTS, the protocol stacks 200 between the BSC and the BTS are shown in FIG. 2. As can be seen, there are multiple layers of protocols on each node to handle the peer-to-peer communications. As shown in FIG. 2, a Traffic Processor (TP) in the BSC receives packets from core networks via the Packet data service node (PDSN). The packets entering the BSC are IP packets encapsulated with GRE (Generic Routing Encapsulation) packets. The BSC processes the GRE packets and forms RLP (Radio Link Protocol) frames. RLP frames will be further passed to lower layers of RMI, UDP or TCP, and finally be formed into an IP packet that is sent over to the cell site.

Each layer of a protocol usually defines a Maximum Transmission Unit (MTU), which is the largest frame size that can be transmitted over the physical network. Messages longer than the MTU must be divided or fragmented into smaller frames. This operation is called fragmentation. The layer 3 protocol, which is IP in this example, extracts the MTU from the layer 2 protocol (e.g., Ethernet, etc.), fragments the messages into that frame size and makes them available to the lower layer for transmission.

In the illustrated radio access network scenario of FIGS. 1 and 2, the MTU size of the IP layer at the TP is 1500-bytes. The RLP frame size, however, is only 128-bytes. To improve the transport efficiency, i.e., to transport more data with the fixed protocol header, the RMI (Remote Method Innovation) protocol can aggregate or bundle the RLP frames together to form a large RMI message. The maximum bundling factor in this example is 11 so that the RMI message can be encapsulated in an IP packet fitting in the 1500-byte size after passing through the UDP or TCP layer.

A large bundling factor is generally preferred, since a large bundling factor increases the transport efficiency by sending more data with the same overhead. In practice, the bundling factor depends on the number of RLP frames currently in a buffer waiting for transmission. It is not always possible, however, to have enough RLP frames to generate a large IP packet sent to the cell. The bundling factor could be increased by intentionally delaying the bundling and transmission of the frames so that more arrival frames can be aggregated together. Blindly implementing such a scheme, however, will increase the packet delay and degrade performance.

Flow control mechanisms are often used to regulate the transmission rate so as to neither overflow nor underflow a receiver or a network. In one example of such flow control mechanisms, a window based flow control algorithm is in place to adjust the data transmission from BSC to BTS. The BTS informs the BSC via a flow control indication message of an advertisement window size, e.g., in number of frames. The BSC then determines its transmission window size and transmits frames within that transmission window. For example, assume the BTS advertises a window size of 50 frames after frame number 10. This means that the BSC can transmit frame number 11, 12, up to frame number 60. If the last frame the BSC has transmitted is frame number 15, the transmission window size at the BSC will be updated as 45, which means 45 frames after frame number 15 can be transmitted. As will be explained this flow control indication message could tell additional information about the congestion status at the BTS that can be utilized by the BSC in the aggregation process. Accordingly, there is a need for an aggregation methodology that makes use of flow control information.

SUMMARY OF THE INVENTION

The present invention is a methodology for providing packet aggregation based on transmission window size to achieve improved transport efficiency. One embodiment of the invention includes a methodology for aggregating packets of a first size to packets of a second size for transmission in a communications network. The method includes the steps of receiving an indication of a transmission window size for packets to be transmitted from a first location to a second location where the transmission window size is provided by a flow control message. The transmission window size is utilized to determine a bundling factor for transmission of packets from said first location to said second location, the bundling factor being a lesser of a maximum bundling factor and the transmission window size. A transmission window size threshold represents a boundary for a size of a transmission window when transmission of existing frames may be delayed. The frames are bundled according to the bundling factor if the transmission window size is greater than the transmission window size threshold.

A bundling factor threshold represents a floor boundary for said bundling factor, wherein if the transmission window size is less than the transmission window size threshold, and if the bundling factor is greater than the bundling factor threshold, packets are aggregated according to the bundling factor for at least a next step in the transmission. If the bundling factor is less than the bundling factor threshold, then bundling of packets is delayed until an update of the transmission window size. A delay timer represents a maximum delay for transmission of packets, wherein packets may be delayed as long as said delay timer is unexpired.

BRIEF DESCRIPTION OF THE DRAWINGS

A more complete understanding of the present invention may be obtained from consideration of the following detailed description of the invention in conjunction with the drawing, with like elements referenced with like references, in which:

FIG. 2 is an exemplary representation of protocol stacks between a base station controller and base station transmitter;

DETAILED DESCRIPTION

The present invention is a methodology for providing packet aggregation based on transmission window size to achieve improved transport efficiency. Although an exemplary embodiment of the invention is described in connection with the transmission between a base station controller (BSC) and a base station (BTS), and the interface/link between them, it would be apparent to those skilled in the art that the present invention is applicable to other network areas requiring packet aggregation, including, for example, voice over IP networks where small application layer packets (e.g., voice frames) need to be aggregated or multiplexed together to be transported over IP networks.

Figure 1:
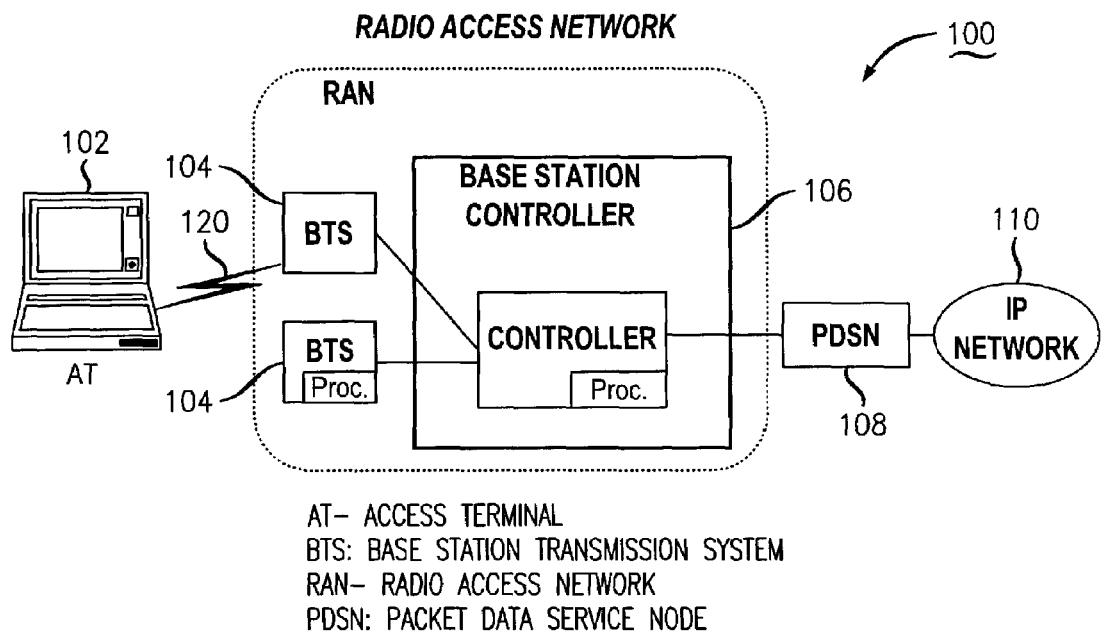
FIG. 1 is an exemplary embodiment of a radio access network.

Referring to FIG. 1, an exemplary flow control mechanism is described with respect to a packet communications transmission between BSC 106 and BTS 104 (referred to hereinafter as Node A and Node B, respectively) for example from BSC to BTS. In accordance with the exemplary mechanism, the transmission window size at Node A is updated when there is a new advertised window size sent from Node B via the flow control indication message. The transmission window will be filled up whenever there is any transmission of the frames. As a result, the available number of frames eligible for transmission will be reduced. If the transmission window is filled up quickly, it usually indicates that Node A generates and transmits more data than Node B can handle. Thus, the transmission rate at Node A is regulated and limited. On the other hand, if Node A generates and transmits less data than what Node B can handle, the transmission window at Node A will be less occupied so that any new data arriving at Node A can be sent to Node B immediately. Therefore, the status of the transmission window at Node A gives an indication of the congestion situation at Node A versus Node B. For the purpose of frame aggregation and bundling, if the transmission window at Node A is almost full, i.e., the number of frames eligible for transmission is very small, the bundling factor will be limited to the current usable window size, which as stated is very small. For example, if the available window size is only one (1) frame, Node A can bundle only one (1) frame and transmit it, even though there might be more frames waiting. Node A can possibly bundle more frames when the transmission window size is updated by Node B, where the window size will be increased if it is updated. (That is, if Node A receives a new flow control indication message, the window size will be increased. But if the message is lost, the size may not increase. But eventually the window size will increase, otherwise a deadlock situation will occur.) In this scenario, it is better to delay the transmission of that particular frame and wait for the new transmission window size so that a larger bundle size may be able to be used. The delay of transmission will generally not degrade the performance much since (assuming a small window size) even if the frame is sent out, it will most likely be waiting at Node B for transmission. In addition, the transmission window size will most likely be updated quickly enough so that the particular frame in question will be able to be sent out promptly. Delaying its transmission at Node A will not significantly impact the overall delay performance. On the other hand, this method of the present invention improves the transport efficiency because a possible large bundling factor could be used.

In accordance with the discussion of the present invention, it is assumed that application layer packets (e.g., the RLP frames) can be aggregated and encapsulated into an IP packet (executed via multiple layers in the example) at Node A (i.e., BSC). The IP packet is transmitted to Node B (i.e., BTS) and departs for another component. Node B informs Node A of the available window size for accepting new frames from Node A.

The following notations are used throughout the application in describing the invention:

b: Packet bundle factor:, where b=1, 2, . . . , bmax, where bmax is determined from the application layer frame size and the IP MTU size at node A.

n: Number of frames available in the buffer.

W_ava: Available window size advertised by Node B to Node A.

W_tran: Transmission window size at Node A, where W_tran=W_ava—(last transmitted frame at Node A—last received frame at Node B)

A bundling factor threshold, b_th, is also defined, where 1<=b_th<=bmax, which gives a possible floor boundary of the bundling factor. In other words, it is desired that the bundling factor be at least as large as this threshold. For example, b_th can be a fraction of bmax, i.e., ½ bmax, or just a specific number, i.e., 3. A transmission window size threshold, W_tran_th, is also defined which represents the boundary of the window size when the transmission of existing frames may be delayed. A delay timer, T_delay, is defined which sets a boundary for the maximum delay in transmitting frames.

Figure 3:
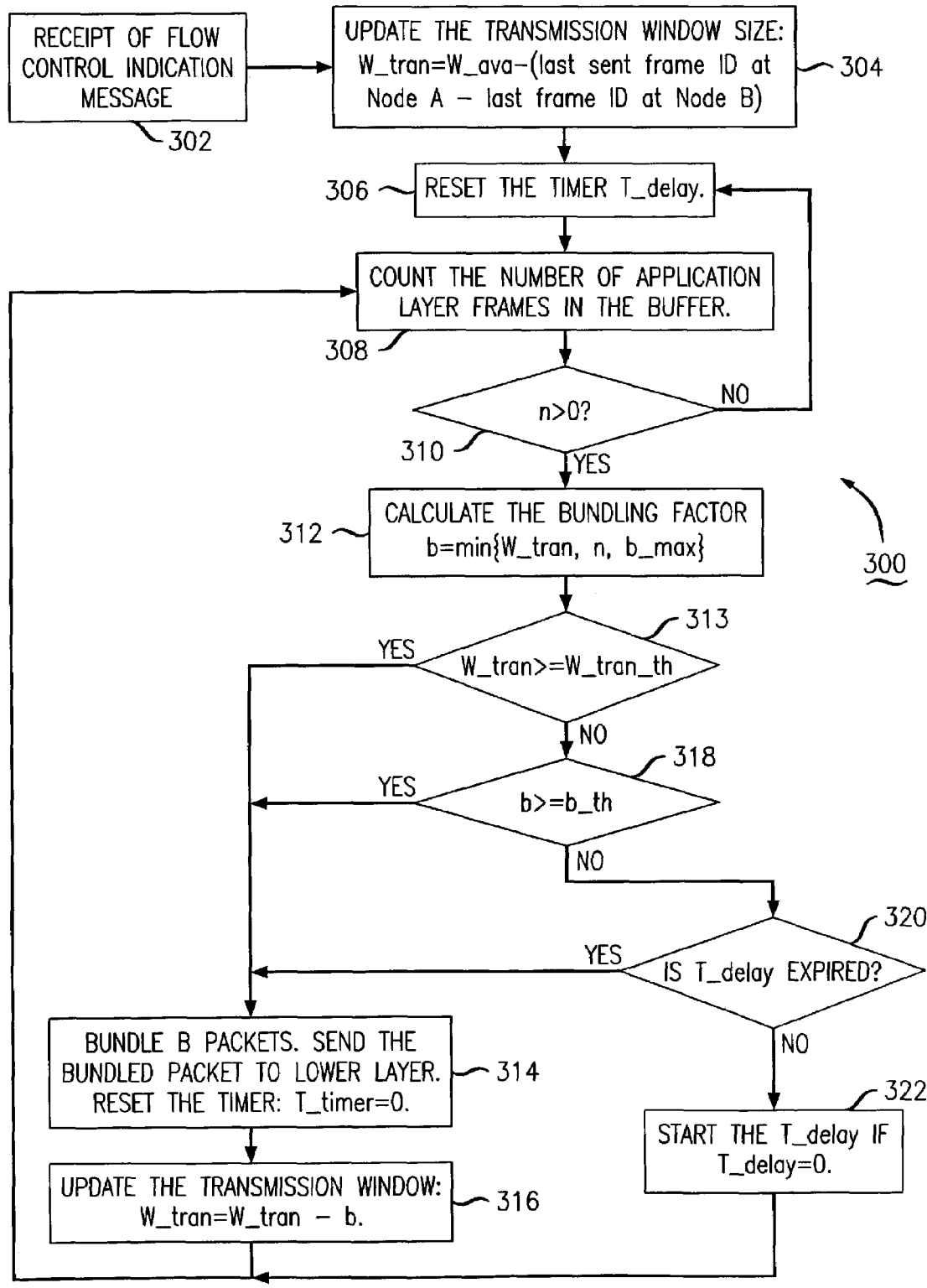
FIG. 3 is an exemplary flow diagram of the aggregation methodology according to the present invention.

Exemplary Algorithm:

Referring to FIG. 3, an exemplary methodology in accordance with the present invention is shown in flow chart form (300) for providing packet aggregation in coordination with a flow control mechanism to achieve higher transport efficiency.

A first step in accordance with the present invention is to receive a flow control indication message, for example, from an upstream node, represented by box 302. After the flow control indication is received, the transmission window size is updated at box 304. Here, the current transmission window (W_tran) at Node A is updated based on the available transmission window (W_ava) advertised by Node B (the upstream node) to Node A. The available transmission window is equal to the number of frames the Node B buffer can accept. For example, assuming the node B buffer can hold 400 frames and has 200 frames in it, W_ava=200 frames, which can be advertised to Node A. The flow control indication message also includes the last frame ID in the buffer. The transmission window at Node A is then updated as: W_ava-(last Frame ID transmitted at Node A-last Frame ID received at Node B). Thus, the frame ID is a frame identifier, which can also be a frame number or other like representation. A delay timer, T_delay, is reset at box 306. A next step 308 in the methodology of the present invention is to determine the number of application layer frames in the applicable transmit buffer. If there are zero frames in the buffer, then the method waits for the buffer to contain cells 310. If n is greater than zero (n>0), then the bundling factor is calculated, where b is the minimum of W_tran, n and b_max, at step 313. At step 312, it is checked if the transmit window (W_tran) is greater than or equal to the transmit window threshold (W_tran_th).

If W_tran>=W_tran_th, then b packets are bundled together and the bundled packets are sent to the lower layer, e.g., for transmission (step 314). At this point, the delay timer (T_delay) is also reset. At step 316, the transmission window is updated, where W_tran=W_tran-b. The method then proceeds to step 308.

At decision box 313, if W_tran is not greater or equal to W_tran_th (W_tran<W_tran_th, at step 318 check if b is greater or equal to b_th (b>=b_th) If yes, then proceed to box 314, where b packets are bundled. If b<b_th, then at box 320, check if the delay timer (T_delay) is expired. If yes, then proceed to step (box) 314. If the timer has not expired, proceed to box 322, and do not bundle the frames. At this point start a delay timer associated with the delayed frames if it has not been triggered., then proceed to Box 308.

A short hand summary of one embodiment of the present invention is given below:
1. Update the transmission window size upon received a flow control indication message.
2. While the number of frames n is not zero,
3. Determine the bundling factor: b, which is the minimum of n, b_max and W_tran.
4. If W_tran>=W_tran_th
   a. Bundle b frames together. Send the bundled packet to lower layer.
   b. Update the transmission window size W_tran.
   c. Reset the timer T_delay.
   d. Go back to step 1.
5. Else if W_tran<W_tran_th,
   a. If b>=b_th, bundle b frames together.
      Send the bundled packet to lower layer.
      Update the transmission window size W_tran.
      Reset the timer.
      Go back to step 1.
   b. Else (b<b_th)
      If timer has not expired,
         Do not bundle the frames. Start a timer T_delay associated with the delayed frames if it has not be triggered.
         Go back to step 1.
      Else
         Bundle the frames. Go back to step 1.

In step 5 when the transmission window is less than the threshold, the bundling process may still be performed if the pre-defined bundling factor threshold is less than the window size threshold, i.e., b_th<W_tran_th. The use of two pre-defined thresholds gives the design flexibility of choosing different criteria. In addition, a timer associated with any delayed transmission is utilized. The purpose of the timer is that the maximum delay of transmitting the frames will be bounded. This is especially useful if there is an error or loss of the flow control indication message and thus the transmission window size at Node A is not updated promptly. The timer avoids the situation that the frames will be waiting at Node A for an arbitrarily long time.

Figure 4:
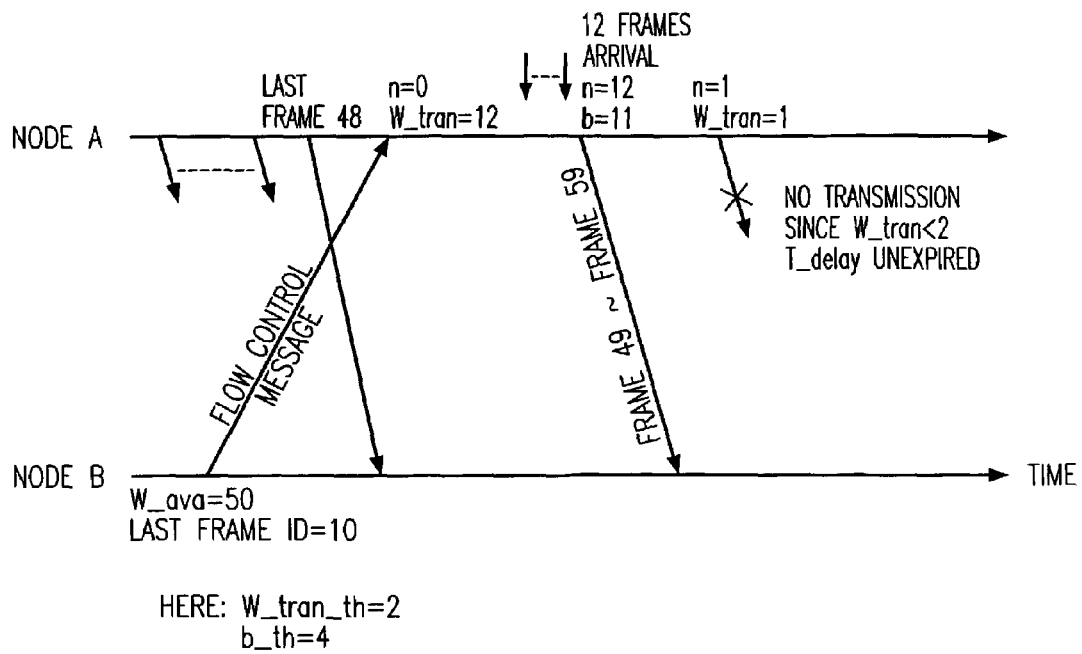
FIG. 4 illustrates an example implementation of the present invention.

To further illustrate the proposed aggregation method, an example is presented (see FIG. 4). Assume that the maximum bundling factor is 11, W_tran th is 2 frames, b_th is 3 frames. Assume that Node B indicates to Node A of an available window size of 50 from frame ID 10, since then, Node A has transmitted frames of frame ID 48. The usable window size at Node A is thus 12 and the buffer is empty. More specifically referring to the above, W_ava=50, last-frameID=10, W_tran=50-(48-10)=12; essentially Node B informs Node A that Node A can transmit 50 more frames after frame 10. Since Node A has already transmitted frame 48. It can transmit 12 more frames. Then a new arrival packet enters node A and generates 12 application frames. Node A first bundles 11 frames and sends them to Node B. The transmission window size is reduced to 1 and there is exactly 1 frame remaining. Since the transmission window size is smaller than the threshold, the last frame will not be transmitted by Node A until a new transmission window size is updated or the timer expires.

Some of the advantages of the present invention packet aggregation method are that: Packet aggregation improves the transport efficiency by sending more data with less overhead. The invention makes use of the flow control information, specifically, the transmission window size information, to improve the aggregation/bundling efficiency. The invention also delays the transmission of certain frames if the transmission window is highly occupied. Accordingly, the invention does not degrade the overall delay performance by controlling the transmission in a smart way.

Other advantages of the invention are that it provides flexibility of design and implementation via a few number of parameter settings. In addition, the invention avoids deadlock of transmission via delay timer mechanisms.

As would be understood by persons skilled in the art, the present invention may be implemented in software, firmware, hardware or combinations thereof network nodes of a communications system. These nodes include suitable hardware, such as a processor and memory, along with appropriate circuit logic for implementation of the invention. It would also be understood that the present invention may be implemented in other types of equipment in a communications network that would call for functionality in accordance with the invention. For example, as shown in FIG. 1, the BTSs and BSC each include processors for implementation of the present invention.

Another application of the present invention is in a voice over packet communications, specifically voice over IP. In such applications, small voice segments are multiplexed (aggregated, bundled) into a larger packet for transport efficiency. Typically, the size of the larger packet is a global parameter and not optimized for every node on the network. The invention can be utilized to rebundle the packet to minimize the transport cost, while minimizing fragmentation for environments where the voice frames need to be transferred over a media with smaller packet sizes. Such an application would be, for example, if the voice gateway has internal packet size limitations.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims appended hereto.

What is claimed is:

1. A method of aggregating packets of a first size to packets of a second size for transmission in a communications network, said method comprising the steps of:
   receiving an indication of a transmission window size for packets to be transmitted from a first location to a second location, said transmission window size being variable and being updated from time to time;
   utilizing said transmission window size to determine a bundling factor for transmission of packets from said first location to said second location, said bundling factor being a lesser of a maximum bundling factor and said transmission window size and
   transmitting said packets from said first location to said second location utilizing said bundling factor;
   wherein a transmission window size threshold represents a boundary for a size of a transmission window and a bundling factor threshold represents a floor boundary for said bundling factor, wherein if said transmission window size is less than said transmission window size threshold, and if said bundling factor is greater than said bundling factor threshold, packets are aggregated according to said bundling factor for at least a next step in the transmission.

2. The method of claim 1, wherein a transmission window size threshold represents a boundary for a size of a transmission window wherein said packets are bundled according to said bundling factor if said transmission window size is greater than said transmission window size threshold.

3. The method of claim 1, wherein if the bundling factor is less than the bundling factor threshold, then bundling of packets is delayed until an update of the transmission window size.

4. The method of claim 3, wherein a delay timer represents a maximum delay for transmission of packets, wherein packets are allowed to be delayed as long as said delay timer is unexpired.

5. The method of claim 1, said bundling factor being a lesser of said maximum bundling factor, said transmission window size and a number of packets available in a buffer.

6. The method of claim 1, wherein said transmission size window is transmitted in a flow control message.

7. The method of claim 1, wherein the transmission window size is updated after transmission of packets.

8. The method of claim 1, wherein said method is utilized for transmission in a wireless communications network between a base station controller and base transmitting station.

9. A method of aggregating packets of a first size to packets of a second size for transmission in a communications network, said method comprising the steps of:
   receiving an indication of a transmission window size for packets to be transmitted from a first location to a second location, said transmission window size provided by a flow control message, said transmission window size being variable and being updated from time to time;
   utilizing said transmission window size to determine a bundling factor for transmission of packets from said first location to said second location, said bundling factor being a lesser of a maximum bundling factor and said transmission window size;
   wherein a transmission window size threshold represents a boundary for a size of a transmission window, wherein said frames are bundled according to said bundling factor if said transmission window size is greater than said transmission window size threshold, and
   transmitting said packets from said first location to said second location utilizing said bundling factor;
   wherein a bundling factor threshold represents a floor boundary for said bundling factor, wherein if said transmission window size is less than said transmission window size threshold, and if said bundling factor is greater than said bundling factor threshold, packets are aggregated according to said bundling factor for at least a next step in the transmission.

10. The method of claim 9, wherein if the bundling factor is less than the bundling factor threshold, then bundling of packets is delayed until an update of the transmission window size.

11. The method of claim 10, wherein a delay timer represents a maximum delay for transmission of packets, wherein packets are allowed to be delayed as long as said delay timer is unexpired.

12. The method of claim 9, said bundling factor being a lesser of said maximum bundling factor, said transmission window size and a number of packets available in a buffer.

13. A apparatus for converting packets of a first size to packets of a second size for transmission in a communications network, said apparatus comprising:
   at least one input and at least one output for inputting and outputting packets, respectively;
   a delay timer for setting a maximum delay for transmission of packets, wherein packets are allowed to be delayed as long as said delay timer is unexpired; and
   a processor which receives an indication of a transmission window size for packets to be transmitted from a first location to a second location, said transmission window size being variable and being updated from time to time;
   said processor also utilizing said transmission window size to determine a bundling factor for transmission of packets from said first location to said second location, said bundling factor being a lesser of a maximum bundling factor and said transmission window size.
   wherein said packets are transmitted from said first location to said second location utilizing said bundling factor;
   wherein a transmission window size threshold represents a boundary for a size of a transmission window and a bundling factor threshold represents a floor boundary for said bundling factor, wherein if said transmission window size is less than said transmission window size threshold, and if said bundling factor is greater than said bundling factor threshold, packets are aggregated according to said bundling factor for at least a next step in the transmission.

14. The apparatus of claim 13, wherein a transmission window size threshold represents a boundary for a size of a transmission window wherein said packets are bundled according to said bundling factor if said transmission window size is greater than said transmission window size threshold.

15. The apparatus of claim 13, wherein if the bundling factor is less than the bundling factor threshold, then bundling of packets is delayed until an update of the transmission window size.

16. The apparatus of claim 13, said bundling factor being a lesser of said maximum bundling factor, said transmission window size and a number of packets available in a buffer.

17. The apparatus of claim 13, wherein said transmission size window is transmitted in a flow control message.

18. The apparatus of claim 1, wherein the transmission window size is updated after transmission of packets.

* * * * *